United States Patent [19]

Yamashita et al.

[11] Patent Number: 5,743,945
[45] Date of Patent: Apr. 28, 1998

[54] INK FOR INK JET RECORDING AND INK JET RECORDING PROCESS

[75] Inventors: Yoshiro Yamashita; Ken Hashimoto, both of Minami-ashigara, Japan

[73] Assignee: Fuji Xerox Co., Ltd., Tokyo, Japan

[21] Appl. No.: 763,886

[22] Filed: Dec. 11, 1996

[30]     Foreign Application Priority Data

Dec. 14, 1995 [JP] Japan ..................... 7-325369

[51] Int. Cl.⁶ ........................................... C09D 11/02
[52] U.S. Cl. ......................... 106/31.58; 106/31.86
[58] Field of Search .................... 106/31.58, 31.86

[56]     References Cited

U.S. PATENT DOCUMENTS

| | | | |
|---|---|---|---|
| 5,141,556 | 8/1992 | Matrick | 106/31.58 |
| 5,141,558 | 8/1992 | Shirota et al. | 106/31.58 |
| 5,169,437 | 12/1992 | You | 106/31.58 |
| 5,180,425 | 1/1993 | Matrick et al. | 106/31.58 |
| 5,207,824 | 5/1993 | Moffatt et al. | 106/31.58 |
| 5,268,027 | 12/1993 | Chan et al. | 106/31.58 |
| 5,356,464 | 10/1994 | Hickmann et al. | 106/31.58 |
| 5,656,071 | 8/1997 | Kappele et al. | 106/31.86 |

FOREIGN PATENT DOCUMENTS

| | | |
|---|---|---|
| 4-332775 | 11/1992 | Japan . |
| 6-240188 | 8/1994 | Japan . |
| 6-240189 | 8/1994 | Japan . |

*Primary Examiner*—Helene Klemanski
*Attorney, Agent, or Firm*—Oliff & Berridge, PLC

[57]     ABSTRACT

An ink for ink jet recording process, comprising water, a coloring material and a water-soluble organic solvent, wherein the ink further comprises a compound having a plurality of hydroxyl groups and at least one group selected from the group consisting of alkyl, haloalkyl, alkenyl, alkinyl, cycloalkyl and aromatic groups each having from 5 to 18 carbon atoms.

19 Claims, No Drawings

INK FOR INK JET RECORDING AND INK JET RECORDING PROCESS

FIELD OF THE INVENTION

The present invention relates to a novel ink for use in ink jet recording apparatus and to an ink jet recording process using the ink.

BACKGROUND OF THE INVENTION

A recording apparatus using so-called ink jet process in which a liquid or molten solid ink is jetted through a nozzle, slit or porous film to effect recording on paper, cloth, film, etc. can be advantageously produced in a small size at a low cost and operates noiselessly and thus has been extensively studied. In recent years, products for use in color image forming apparatus capable of full-color recording have put on the market as well as those for use in monochromatic printers capable of forming a high print quality image on a so-called plain paper such as report paper and copying paper. Thus, the ink jet recording apparatus has recently played an important role in the art of recording apparatus.

An ink for use in the ink jet recording apparatus is mainly composed of a solvent, a coloring material and additives. The ink for ink jet recording is required to meet the following requirements:

(1) It provides a uniform image with a high resolution and a high density without causing feathering on paper;
(2) It causes no clogging due to drying thereof at the tip of the nozzle, and always exhibits excellent jetting response and jetting stability;
(3) It quickly dries up on a paper;
(4) It provides in image having a good fastness; and
(5) It shows a good stability during a prolonged storage.

Further, in recent years, some problems have been presented in conventional ink jet recording processes. For example, the printed paper warps as the ink is dried, occasionally being deformed into a cylinder form in an extreme case. This phenomenon is called curling. Furthermore, wrinkles occur on the surface of the paper during printing. This phenomenon is called "cockle". To solve these problems, several techniques have been proposed. JP-A-4-332775 (The term "JP-A" as used herein means an "unexamined published Japanese patent application") discloses an ink comprising a solid substance (mainly saccharides) having four or more hydroxyl groups per molecule and being soluble in water and a water-soluble organic solvent. U.S. Pat. No. 5,356,464 discloses an ink comprising 1,3-diol, 1,3,5-triol, amino-1,3-diol, 1,2,3-triol, ethylene oxide adduct thereof or propylene oxide adduct thereof, pyranoside and polyalkoxyalkylene derivative thereof, and polyoxyalkylene derivative of aliphatic polyamine. Further, JP-A-6-240189 discloses an ink comprising a sugar represented by the general formula $CH_2OH—(CHOH)_h—CH_2OH$ (wherein h represents an integer of from 3 to 15) in an amount of from 4 to 20% by weight. Moreover, JP-A-6-240188 discloses an ink comprising pentanediol or hexanetriol each having from 4 to 8 carbon atoms and from 2 to 3 hydroxyl groups per molecule in an amount of from 15 to 50% by weight.

As mentioned above, many techniques for inhibiting curling and cockle have been proposed. However, none of the foregoing proposed inks can satisfactorily meet the above described requirements. Thus, these inks leave something to be desired.

SUMMARY OF THE INVENTION

It is therefore an object of the present invention to provide an ink which causes no curling or cockle and can meet all the above described requirements for ink for use in ink jet recording.

Another object of the present invention is to provide an ink jet recording process using the above described ink, which can provide a uniform image with a high resolution and a high density without causing feathering.

Other objects and effects of the present invention will be apparent from the following description.

As a result of extensive studies, the inventors have found that the incorporation of a compound having a plurality of hydroxyl groups and at least one group selected from the group consisting of alkyl, haloalkyl, alkenyl, cycloalkyl and aromatic groups each having from 5 to 18 carbon atoms, in an ink for ink jet recording process comprising water, a water-soluble organic solvent and a coloring material as essential components makes it possible to exert effects of inhibiting curling and cockle on the printed paper, image disturbance and nozzle clogging and of accelerating the drying of the image. Thus, the present invention has been worked out.

The present invention relates to an ink for ink jet recording process comprising water, a coloring material and a water-soluble organic solvent, wherein the ink further comprises a compound having (a) a plurality of hydroxyl groups and (b) at least one group selected from the group consisting of alkyl, haloalkyl, alkenyl, alkinyl, cycloalkyl and aromatic groups each having from 5 to 18 carbon atoms.

The present invention also relates to an ink jet recording process which comprises jetting an ink droplet through an orifice in response to a recording signal to effect recording, wherein the above described ink of the present invention is used as the ink.

DETAILED DESCRIPTION OF THE INVENTION

The present invention is described in detail below.

In the present invention, a compound having (a) a plurality of hydroxyl groups and (b) at least one group selected from the group consisting of alkyl, haloalkyl, alkenyl, alkinyl and cyclic alkyl and aromatic groups each having 5 to 18 carbon atoms is used in the ink as described below. In particular, compounds represented by the following structural formulae (1) to (5) are preferred because they can be rapidly dried and cause no curling or cockle, image disturbance and nozzle clogging.

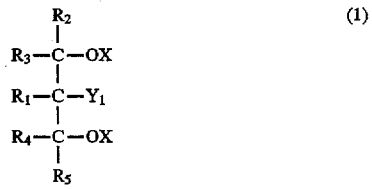

(1)

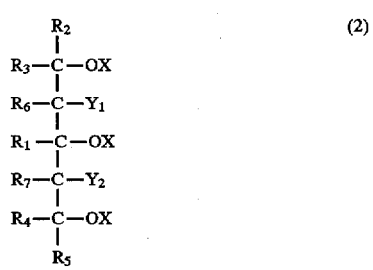

(2)

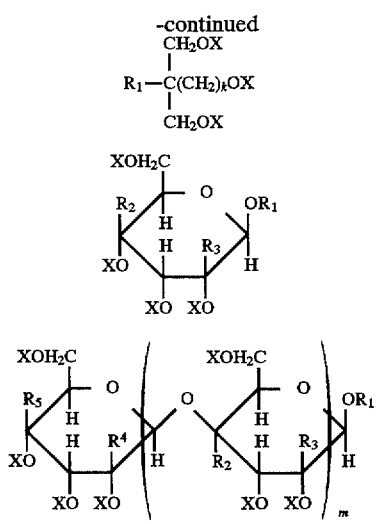

wherein X represents a hydrogen atom, $(C_2H_4O)_pH$ or $(C_3H_6O)_pH$; $Y_1$ and $Y_2$ each represents a hydrogen atom, OH, $(C_2H_4O)_qH$ or $(C_3H_6O)_qH$, wherein p and q each represents an integer of from 1 to 60); $R_1$ to $R_7$ each represents a hydrogen atom, $C_nH_{2n+1}$, $C_nH_{2n-1}$, $C_nH_{2n-3}$, $C_nH_{2n+1-x}Z_x$, $C_nH_{2n-1-x}Z_x$, $C_nH_{n-1-x}Z_x$ (wherein Z represents a halogen atom, and n represents an integer of from 1 to 18), an aromatic group, a hydrocarbon group having an aromatic ring or a halogen-substituted aromatic group, provided that at least one of $R_1$ to $R_7$ is a hydrocarbon group having from 5 to 18 carbon atoms; k represents an integer of from 1 to 8; and m represents an integer of from 1 to 4.

Preferred among these compounds are those wherein $Y_1$ and $Y_2$ each represent a hydrogen atom. When X is an oxyethylene group or oxypropylene group, p and q is preferably from 1 to 40, more preferably from 1 to 30. When the number of oxyethylene groups or oxypropylene groups is too large, the resulting ink tends to occur clogging. $R_1$ to $R_7$ each preferably has 18 or less carbon atoms. If the number of carbon atoms is not less than 19, the resulting compound has too strong hydrophobicity. This strong hydrophobicity weakens the affinity for cellulose, making it difficult to exert its effect. The compounds represented by the general formulae (1) to (5) for use in the present invention must have at least one hydrocarbon group having from 5 to 18 carbon atoms per molecule.

Specific examples of the compounds represented by the structural formulae (1) to (5) are shown in Tables 1 to 5 below.

Compounds represented by the structural formula (1):

TABLE 1

|    | $R_1$          | $R_2$  | $R_3$          | $R_4$          | $R_5$  | X               | $Y_1$ |
|----|----------------|--------|----------------|----------------|--------|-----------------|-------|
| 1  | $C_7H_{15}$    | H      | $C_7H_{15}$    | $C_7H_{15}$    | H      | $(C_2H_4O)_8H$  | H     |
| 2  | $C_{10}H_{21}$ | H      | H              | H              | H      | $(C_2H_4O)_4H$  | H     |
| 3  | H              | H      | $C_{10}H_{21}$ | $C_{10}H_{21}$ | H      | $(C_2H_4O)_{10}H$ | H   |
| 4  | $C_{16}H_{31}$ | H      | H              | H              | H      | $(C_2H_4O)_{16}H$ | H   |
| 5  | $CH_3$         | H      | $C_5F_9$       | $C_5F_9$       | H      | $(C_3H_6O)_5H$  | H     |
| 6  | $C_6H_{13}$    | $CH_3$ | $C_6H_{13}$    | $C_6H_{13}$    | $CH_3$ | $(C_2H_4O)_8H$  | H     |
| 7  | H              | H      | $C_7Cl_3H_{13}$ | $C_7Cl_3H_{13}$ | H    | $(C_3H_6O)_3H$  | H     |
| 8  | $C_8H_{17}$    | H      | H              | H              | H      | H               | H     |
| 9  | $C_{14}H_{27}$ | H      | $C_3H_7$       | $C_3H_7$       | H      | $(C_2H_4O)_{25}H$ | H   |
| 10 | $C_{12}F_{11}H_{14}$ | H | H           | H              | H      | $(C_2H_4O)_8H$  | H     |

Compounds represented by the structural formula (2):

TABLE 2

|   | $R_1$          | $R_2$  | $R_3$    | $R_4$    | $R_5$  | $R_6$          | $R_7$          | X                | $Y_1$  | $Y_2$  |
|---|----------------|--------|----------|----------|--------|----------------|----------------|------------------|--------|--------|
| 1 | $C_{12}H_{25}$ | H      | $CH_3$   | $CH_3$   | H      | $CH_3$         | $CH_3$         | $(C_3H_6O)_4H$   | H      | H      |
| 2 | $C_{10}H_{21}$ | H      | $CH_3$   | $CH_3$   | H      | $CH_3$         | $CH_3$         | $(C_2H_4O)_3H$   | H      | H      |
| 3 | $C_7H_{15}$    | H      | $C_3H_7$ | $C_3H_7$ | H      | H              | H              | $(C_2H_4O)_{12}H$ | H     | H      |
| 4 | $C_6H_5$       | H      | $C_2H_5$ | $C_2H_5$ | H      | H              | H              | $(C_2H_4O)_5H$   | H      | H      |
| 5 | $CH_3$         | $CH_3$ | $CH_3$   | $CH_3$   | $CH_3$ | $C_{10}H_{21}$ | $C_{10}H_{21}$ | $(C_2H_4O)_6H$   | $CH_3$ | $CH_3$ |
| 6 | $C_{14}H_{27}$ | H      | H        | H        | H      | H              | H              | $(C_2H_4O)_{16}H$ | H     | H      |
| 7 | $C_{12}H_{23}$ | H      | $CH_3$   | $CH_3$   | H      | H              | H              | H                | OH     | OH     |
| 8 | H              | H      | H        | H        | H      | $C_6H_{11}$    | $C_6H_{11}$    | $(C_3H_6O)_5H$   | H      | H      |

Compounds represented by the structural formula (3):

TABLE 3

|   | $R_1$ | X | k |
|---|---|---|---|
| 1 | $C_{12}H_{25}$ | $(C_2H_4O)_6H$ | 4 |
| 2 | $C_6H_{11}CH_2$ | $(C_3H_6O)_5H$ | 8 |
| 3 | $C_{18}H_{35}$ | $(C_2H_4O)_{16}H$ | 2 |
| 4 | $C_{14}H_{27}$ | H | 2 |
| 5 | $C_{10}F_7H_{14}$ | $(C_2H_4O)_3H$ | 3 |
| 6 | $C_6H_5$ | H | 5 |
| 7 | $C_5H_{10}Cl$ | H | 6 |

Compounds represented by the structural formula (4):

TABLE 4

|   | $R_1$ | $R_2$ | $R_3$ | X |
|---|---|---|---|---|
| 1 | $C_{18}H_{35}$ | H | H | $(C_2H_4O)_{10}H$ |
| 2 | $C_{12}H_{23}$ | H | H | H |
| 3 | $C_2H_5C_6H_4CH_2$ | H | H | $(C_2H_4O)_3H$ |
| 4 | $C_{14}H_{27}$ | H | H | H |
| 5 | $C_{10}H_7CH_2$ | H | H | H |
| 6 | $C_{14}F_{11}H_{18}$ | H | H | $(C_2H_4O)_3H$ |
| 7 | $C_7H_{15}$ | $CH_3$ | $CH_3$ | $(C_3H_6O)_8H$ |
| 8 | $C_{18}H_{37}$ | H | H | $(C_2H_4O)_5H$ |

Compounds represented by the structural formula (5):

TABLE 5

|   | $R_1$ | $R_2$ | $R_3$ | $R_4$ | $R_5$ | X | m |
|---|---|---|---|---|---|---|---|
| 1 | $C_{10}H_{21}$ | H | H | H | H | $(C_2H_4O)_8H$ | 1 |
| 2 | $C_{16}H_{31}$ | H | H | H | H | $(C_2H_4O)6H$ | 1 |
| 3 | $C_{14}H_{29}$ | H | H | H | H | H | 2 |
| 4 | $C_{12}F_{11}H_{14}$ | H | H | H | H | H | 3 |
| 5 | $C_6H_{11}$ | $CH_3$ | H | $CH_3$ | H | $(C_3H_6O)_3H$ | 1 |
| 6 | $C_{10}Cl_5H_{16}$ | H | H | H | H | $(C_2H_4O)_{10}H$ | 4 |
| 7 | $C_6H_5$ | H | H | H | H | H | 2 |

In the present invention, the addition of the above described compounds in ink makes it possible to suppress curling and cockle of the printed paper. The content of the compound is preferably from 0.01 to 20% by weight, more preferably from 0.01 to 10% by weight, based on the total weight of the ink. If the content of the compound falls below 0.01% by weight, the resulting effect of inhibiting curling and cockle is lowered. On the other hand, if the content of the compound exceeds 20% by weight, the resulting ink tends to cause troubles such as acceleration of nozzle clogging or deterioration of jettability due to a rise in the viscosity of the ink, feathering, and the like.

The water-soluble organic solvent for use in the present invention as an essential component of the ink is frequently used to prevent the evaporation of water in the art. In the present invention, known solvents can be used. Examples of the water-soluble organic solvent employable herein include polyvalent alcohols (such as ethylene glycol, diethylene glycol, propylene glycol, polyethylene glycol, triethylene glycol, glycerin, trimethylol propane, 1,2,6-hexanetriol, 1,5-pentanediol and dipropylene glycol), glycol ethers (such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether and triethylene glycol monobutyl ether), sulfur-containing solvents (such as thiodiethanol, 2-mercaptoethanol, thioglycerol, sulfolane and dimethyl sulfoxide), and nitrogen-containing solvents (such as 2-pyrrolidone, N-methyl-2-pyrrolidone, cyclohexyl pyrrolidone, triethanolamine and diethanolamine. These water-soluble organic solvents may be used alone or in admixture of two or more thereof. If the content of the water-soluble organic solvent is increased, it raise the resulting viscosity of the ink to deteriorate jetting stability and jetting response. Therefore, the content of the water-soluble organic solvent is preferably about from 1 to 60% by weight, more preferably about from 5 to 40% by weight, based on the weight of the ink.

The coloring material for use in the present invention may be various dyes, pigments, oil emulsions colored with oil-soluble dye or pigment, colored polymers, waxes, etc. Of various dyes, water-soluble dyes are preferred. The water-soluble dye may be any of acidic dye, direct dye, basic dye and reactive dye. Of these, acidic dyes and direct dyes are preferred. Examples thereof include C.I. Direct Black-2, C.I. Direct Black-4, C.I. Direct Black-9, C.I. Direct Black-11, C.I. Direct Black-17, C.I. Direct Black-19, C.I. Direct Black-22, C.I. Direct Black-32, C.I. Direct Black-80, C.I. Direct Black-151, C.I. Direct Black-154, C.I. Direct Black-168, C.I. Direct Black-171, C.I. Direct Black-194, C.I. Direct Blue-1, C.I. Direct Blue-2, C.I. Direct Blue-6, C.I. Direct Blue-8, C.I. Direct Blue-22, C.I. Direct Blue-34, C.I. Direct Blue-70, C.I. Direct Blue-71, C.I. Direct Blue-76, C.I. Direct Blue-78, C.I. Direct Blue-86, C.I. Direct Blue-112, C.I. Direct Blue-142, C.I. Direct Blue-165, C.I. Direct Blue-199, C.I. Direct Blue-200, C.I. Direct Blue-201, C.I. Direct Blue-202, C.I. Direct Blue-203, C.I. Direct Blue-207, C.I. Direct Blue-218, C.I. Direct Blue-236, C.I. Direct Blue-287, C.I. Direct Red-1, C.I. Direct Red-2, C.I. Direct Red-4, C.I. Direct Red-8, C.I. Direct Red-9, C.I. Direct Red-11, C.I. Direct Red-13, C.I. Direct Red-15, C.I. Direct Red-20, C.I. Direct Red-28, C.I. Direct Red-31, C.I. Direct Red-33, C.I. Direct Red-37, C.I. Direct Red-39, C.I. Direct Red-51, C.I. Direct Red-59, C.I. Direct Red-62, C.I. Direct Red-63, C.I. Direct Red-73, C.I. Direct Red-75, C.I. Direct Red-80, C.I. Direct Red-81, C.I. Direct Red-83, C.I. Direct Red-87, C.I. Direct Red-90, C.I. Direct Red-94, C.I. Direct Red-95, C.I. Direct Red-99, C.I. Direct Red-101, C.I. Direct Red-110, C.I. Direct Red-189, C.I. Direct Red-227, C.I. Direct Yellow-1, C.I. Direct Yellow-2, C.I. Direct Yellow-4, C.I. Direct Yellow-8, C.I. Direct Yellow-11, C.I. Direct Yellow-12, C.I. Direct Yellow-26, C.I. Direct Yellow-27, C.I. Direct Yellow-28, C.I. Direct Yellow-33, C.I. Direct Yellow-34, C.I. Direct Yellow-41, C.I. Direct Yellow-44, C.I. Direct Yellow-48, C.I. Direct Yellow-58, C.I. Direct Yellow-86, C.I. Direct Yellow-87, C.I. Direct Yellow-88, C.I. Direct Yellow-135, C.I. Direct Yellow-142, C.I. Direct Yellow-144, C.I. Food Black-1, C.I. Food Black-2, C.I. Acid Black-1, C.I. Acid Black-2, C.I. Acid Black-7, C.I. Acid Black-16, C.I. Acid Black-24, C.I. Acid Black-26, C.I. Acid Black-28, C.I. Acid Black-31, C.I. Acid Black-48, C.I. Acid Black-52, C.I. Acid Black-63, C.I. Acid Black-107, C.I. Acid Black-112, C.I. Acid Black-118, C.I. Acid Black-119, C.I. Acid Black-121, C.I. Acid Black-156, C.I. Acid Black-172, C.I. Acid Black-194, C.I. Acid Black-208, C.I. Acid Blue-1, C.I. Acid Blue-7, C.I. Acid Blue-9, C.I. Acid Blue-15, C.I. Acid Blue-22, C.I. Acid Blue-23, C.I. Acid Blue-27, C.I. Acid Blue-29, C.I. Acid Blue-40, C.I. Acid Blue-43, C.I. Acid Blue-55, C.I. Acid Blue-59, C.I. Acid Blue-62, C.I. Acid Blue-78, C.I. Acid Blue-80, C.I. Acid Blue-81, C.I. Acid Blue-83, C.I. Acid Blue-90, C.I. Acid Blue-102, C.I. Acid Blue-104, C.I. Acid Blue-111, C.I. Acid Blue-185, C.I. Acid Blue-249, C.I. Acid Blue-254, C.I. Acid Red-1, C.I. Acid Red-4, C.I. Acid Red-8, C.I. Acid Red-13, C.I. Acid Red-14, C.I. Acid Red-15, C.I. Acid Red-18, C.I. Acid Red-21, C.I. Acid Red-26, C.I. Acid Red-35, C.I. Acid Red-37, C.I. Acid Red-52, C.I. Acid Red-110, C.I. Acid Red-144, C.I. Acid Red-180, C.I. Acid Red-249, C.I. Acid Red-257, C.I. Acid Yellow-1, C.I. Acid Yellow-3, C.I. Acid Yellow-4, C.I. Acid Yellow-7, C.I. Acid Yellow-11, C.I. Acid Yellow-12, C.I. Acid Yellow-13, C.I. Acid Yellow-14, C.I. Acid Yellow-18, C.I. Acid Yellow-19, C.I. Acid Yellow-23, C.I. Acid Yellow-25, C.I. Acid Yellow-34, C.I. Acid Yellow-38, C.I. Acid Yellow-41, C.I. Acid Yellow-42, C.I. Acid Yellow-44, C.I. Acid Yellow-53, C.I. Acid Yellow-55, C.I. Acid Yellow-61, C.I. Acid Yellow-71, C.I. Acid Yellow-76, C.I. Acid Yellow-78, C.I. Acid Yellow-79 and C.I. Acid Yellow-122. These dyes may be used alone. Alternatively, two or more of these dyes may be used in admixture. Further, these dyes may be toned to a custom color such as red, blue and green as well as four primary colors such as cyan, magenta, yellow and black.

The coloring material may be used a pigment as described above. For example, carbon black, brilliant carmine BS, lake carmine FB, brilliant fast scarlet, disazo yellow, permanent red R, quinacridone magenta, fast yellow 10G, phthalocyanine blue, blue lake, yellow lake, rhodamine lake or the like may be dispersed with a dispersant to prepare a pigment-dispersed ink. The dispersant for dispersing the pigment may be any commonly used dispersant. Examples thereof include naphthalenesulfonic acid-formalin condensate, methacrylic acid-methacrylic acid ester copolymer, styrene-maleic acid copolymer, styrene-acrylic acid copolymer, and styrene-sulfonic acid resin.

In the ink of the present invention, the content of the coloring material is preferably from 0.1 to 20% by weight, more preferably from 1 to 10% by weight of the ink. If the content of the coloring material is increased, it accelerates clogging upon evaporation of water at the tip of the nozzle. On the contrary, if the content of the coloring material is reduced, a sufficient density cannot be obtained.

The ink of the present invention may comprise a surface active agent incorporated therein to adjust its physical properties. The surface active agent stabilizes the dissolution and dispersion states of the dye or pigment. In addition, it accelerates the penetration of the ink into paper and the drying of the ink. It also contributes to the improvement of the anti-clogging properties. It further contributes to the enhancement of the wiper cleaning properties of the ink jet head. Various surface active agents may be used as the surface active agent, but nonionic surface active agents, anionic surface active agents and amphoteric surface active agents are preferred. Examples of the nonionic surface active agent include polyoxyethylene alkylphenyl ether, polyoxyethylene alkyl ether, polyoxyethylene aliphatic acid ester, sorbitan aliphatic acid ester, polyoxyethylene sorbitan aliphatic acid ester, polyoxyethylene glycerin aliphatic acid ester, polyglycerin aliphatic acid ester, polyoxyethylene sorbit aliphatic acid ester, polyoxyethylene sterol, polyoxyethylene polyoxypropylene ether, polyoxyethylene aliphatic acid amide, polyoxyethylene polyoxypropylene block copolymer, tetramethyldecyne diol, and tetramethyldecyne diol ethylene oxide adduct.

Examples of the anionic surface active agent include alkylbenzenesulfonate, alkylphenylsulfonate, alkylnaphthalenesulfonate, higher aliphatic acid salt, sulfuric acid ester of higher aliphatic acid ester, sulfonate of higher aliphatic acid ester, sulfuric acid ester salt of higher alcohol ether, sulfonate of higher alcohol ether, higher alkylsulfosuccinate, formalin condensate of naphthalenesulfonic acid salt, polystyrenesulfonate, polyacrylate, polyoxyethylene alkylether phosphate, alkylether carboxylate, alkylsulfate, and acrylic acid-acrylic acid ester copolymer.

Examples of the amphoteric surface active agent include betaine, sulfobetaine, sulfate betaine and imidazoline.

In addition to these surface active agents, examples of the surface active agent for use in the present invention include a silicone surface active agent such as polysiloxane-polyoxyethylene adduct, a fluorine-containing surface active agent such as perfluoroalkylcarboxylate, perfluoroalkylsulfonate and oxyethylene perfluoroalkyl ether, and a biosurfactant such as spiculisporic acid, rhamnolipid and lysolecithin may be used.

These surface active agents may be used alone or in admixture. The content of the surface active agent is preferably from 0.001 to 10% by weight, more preferably from 0.001 to 5% by weight, of the ink. If the content of the surface active agent falls below the above defined range, the intended effect cannot be exerted. On the contrary, the content of the surface active agent exceeding the above defined range results in excessive penetration to causes feathering. Of the above described compounds, nonionic surface active agents are preferred taking into account feathering of image, dryability, insusceptibility to ink foaming, anti-clogging properties, etc.

The ink of the present invention may further comprise other additives incorporated therein. For example, an acid (such as hydrochloric acid, sulfuric acid, nitric acid, acetic acid, citric acid, oxalic acid, malonic acid, boric acid, phosphoric acid and phosphorous acid), a base (such as sodium hydroxide, potassium hydroxide, lithium hydroxide and ammonia), or a buffering agent (such as phosphate, oxalate, amine salt and good buffer) may be added as a pH adjustor. The pH value of the ink of the present invention is preferably from 3 to 11, more preferably from 4 to 10, taking into account the corrosion on the head or cartridge member.

In addition, a solubilizing agent (such as urea, thiourea and acetamide), a physical property adjustor (such as polyethyleneimine, polyamines, polyvinyl pyrrolidone, polyethylene glycol and cellulose derivatives), a feathering-inhibiting thickener (such as sodium alginate, carboxymethyl cellulose, styrene-acrylic acid copolymer, styrene-maleic anhydride copolymer, methacrylic acid-methacrylic acid ester copolymer, chitin, chitosan, carrageenan), an inclusion compound (such as cyclodextrin, polycyclodextrin, macrocyclic amines, crown ethers), or the like may be added. The term "feathering-inhibiting thickener" as used herein means a substance which allows water in an ink droplet on the paper to evaporate away to rapidly thicken the surface of the droplet and hence inhibit the spread of the ink over the paper, thus inhibiting feathering. If necessary, a mildewproofing agent, anticorrosion agent, an oxidation inhibitor, a chelating agent, etc. may be added.

The viscosity of the ink of the present invention is preferably from 1.3 to 5 mPas. The surface tension of the ink of the present invention is preferably from 20 to 65 mN/m. When the ink of the present invention fall within the above defined range of viscosity and surface tension, the ink can be stably jetted.

The ink of the present invention can be applied to any kind of ink jet printers. For example, when conventional ink is used in a printer of the type in which droplets are jetted by using heat energy, this tends to present a problem of "Kogation", i.e., accumulation of insoluble matters on the heater. However, the ink of the present invention does not aggravate Kogation in such type of printer.

Even when applied to an ink jet printer of the type in which the paper or ink image is heated by irradiation of light, heat, microwave or the like to accelerate the drying or fixing of the ink, the ink of the present invention can exert its effect of inhibiting curling and cockle. Thus, no curling or cockle occurs.

Further, the ink of the present invention is advantageously applied to a high resolution small droplet printing type ink jet recording process in which the jetted amount is in a rate of from 10 to 100 ng per pulse. This is because the specific surface area of the droplet becomes small because of its small droping rate, and therefore the effects of inhibiting curling or cockle are willing to exert.

Moreover, by forming and jetting one droplet with applying a plurality of pulses, i.e., by a method of jetting with applying a prepulse signal prior to the application of main driving signal, the ink of the present invention can be jetted at a stabilized drop rate, providing a constant image improving effect. At the same time, this exerts an effect of enhancing the jetting stability upon continuous jetting.

As described above, the incorporation of a compound having a plurality of hydroxyl groups and at least one group selected from the group consisting of alkyl, haloalkyl, alkenyl, cycloalkyl and aromatic groups having from 5 to 18 carbon atoms in an ink for ink jet recording process comprising water, a water-soluble organic solvent and a coloring material as essential components makes it possible to exert effects of inhibiting curling and cockle on the printed paper, image disturbance and nozzle clogging and of accelerating the drying of the image. The mechanism of the generation of curling and cockle has not yet thoroughly elucidated, but can be presumed as follows. Hydrogen bonds between cellulose fibers in the paper are broken by water in the ink. When the water is evaporated, thus broken hydrogen bonds are recombined. If the recombination of the broken hydrogen bonds is effected at the original positions, there occurs no problems. However, if the recombination of the broken hydrogen bonds is effected at positions different from the original positions, the fibers in the paper locally extend or shrink, to thereby cause curling or cockle. The ink of the present invention comprises the above described specific compound. It can be thought that the plurality of hydroxyl groups contained in the compound can readily be bonded to cellulose to reduce the contact area of water with cellulose fibers, making it difficult to break the hydrogen bond between cellulose fibers. Further, it can be thought that the group selected from the group consisting of alkyl, haloalkyl, alkenyl, alkinyl, cycloalkyl and aromatic groups having 5 or more carbon atoms acts as a hydrophobic group, and thus can readily penetrate into the paper. Thus, the hydrophobic group can come into contact with cellulose fibers earlier than water. Accordingly, the above identified specific compound for use in the present invention can exert its effect even in a smaller content as compared to conventional curling and cockle-inhibiting agents.

The reason why $Y_1$ and $Y_2$ in the structural formulae for the above described specific compound each is preferably a hydrogen atom can be presumed that hydrogen atom does not come to be a chemical structural obstacle to the hydrogen bonding of hydroxyl groups in the compound and cellulose fibers. On the other hand, it can be thought that if $Y_1$ and $Y_2$ each is a hydroxyl group, the adjacent hydroxyl groups are slightly too close to each other to attain hydrogen bonding.

The present invention will be described in more detail with reference to the following Examples and comparative Examples, but the invention should not be construed as being limited thereto.

EXAMPLE 1

| | |
|---|---|
| C.I. Acid Blue-9 | 2 parts by weight |
| Compound of formula (3) ($R_1 = C_{12}H_{25}$; $X = (C_2H_4O)_6H$; $k = 4$) | 4 parts by weight |
| Glycerin | 10 parts by weight |
| Pure water | 85 parts by weight |

The above described components were thoroughly mixed to make a solution which was then filtered through a 0.45-μm filter under pressure to prepare an ink.

COMPARATIVE EXAMPLE 1

| | |
|---|---|
| C.I. Acid Blue-9 | 2 parts by weight |
| Trimethylolpropane | 20 parts by weight |
| Glycerin | 10 parts by weight |
| Pure water | 70 parts by weight |

The above described components were thoroughly mixed to make a solution which was then filtered through a 0.45-μm filter under pressure to prepare an ink.

COMPARATIVE EXAMPLE 2

| | |
|---|---|
| C.I. Acid Blue-9 | 2 parts by weight |
| Trimethylolpropane | 5 parts by weight |
| Glycerin | 15 parts by weight |
| Pure water | 80 parts by weight |

The above described components were thoroughly mixed to make a solution which was then filtered through a 0.45-μm filter under pressure to prepare an ink.

COMPARATIVE EXAMPLE 3

| | |
|---|---|
| C.I. Acid Blue-9 | 2 parts by weight |
| Glucose | 5 parts by weight |
| Glycerin | 10 parts by weight |
| Pure water | 85 parts by weight |

The above described components were thoroughly mixed to make a solution which was then filtered through a 0.45-μm filter under pressure to prepare an ink.

COMPARATIVE EXAMPLE 4

| | |
|---|---|
| C.I. Acid Blue-9 | 2 parts by weight |
| Glucose | 1 part by weight |
| Glycerin | 15 parts by weight |
| Pure water | 80 parts by weight |

The above described components were thoroughly mixed to make a solution which was then filtered through a 0.45-μm filter under pressure to prepare an ink.

COMPARATIVE EXAMPLE 5

| C.I. Acid Blue-9 | 2 parts by weight |
|---|---|
| Glycerin | 15 parts by weight |
| Pure water | 85 parts by weight |

The above described components were thoroughly mixed to make a solution which was then filtered through a 0.45-μm filter under pressure to prepare an ink.

COMPARATIVE EXAMPLE 6

| C.I. Acid Blue-9 | 2 parts by weight |
|---|---|
| 1,5-Pentadiol | 30 parts by weight |
| Pure water | 70 parts by weight |

The above described components were thoroughly mixed to make a solution which was then filtered through a 0.45-μm filter under pressure to prepare an ink.

(Evaluation of ink)

(1) Ink Surface Tension

The surface tension of the ink was measured by means of a Wilhelmy's surface tension balance at 23° C. and 55% RH.

(2) Ink Viscosity

The viscosity of the ink was measured at a shear rate of 1,400 s$^{-1}$, under condition of 23° C. and 55% RH.

(3) Evaluation of Cockle and Curl Height

The ink thus prepared was used to effect 180 mm×250 mm solid printing on A4 size FX-L paper and Xerox 4024 paper using a thermal ink jet printer which had been manufactured for evaluation. The printed image was then observed in terms of the presence of cockle. Further, the printed paper was placed on a flat table with the printed surface thereof upside for 24 hours. The distance between the corner of the paper and the table was measured to evaluate the curl height a) Cockle G . . . No wrinkles observed F . . . Slight wrinkles observed P . . . Remarkable wrinkles observed b) Curl height G . . . Less than 30 mm F . . . From 30 mm to less than 60 mm P . . . Not less than 60 mm, making a cylinder (4) Anti-clogging Properties The ink thus prepared was subjected to jetting using a thermal ink jet printer having a resolution of 600 dpi, which had been manufactured for evaluation. After the suspension of jetting, the printer was allowed to stand as uncapped at 23° C. and 55% RH. The time required until any image disturbance occurs when jetting is resumed was determined. The evaluation was conducted in accordance with the following criteria:

G . . . Not shorter than 1 min

F . . . From 0.5 min to shorter than 1 min

P . . . Shorter than 0.5 min (5) Drying Time

The ink thus prepared was used to effect 40 mm×10 mm solid image printing on FX-L paper (available from Fuji Xerox Co., Ltd.) as a plain paper. A coated paper for ink jet printing was superposed on the printed paper, and a pressure of 100 g was then applied to the laminate. The time required until the ink is no more transferred to the coated paper was determined. The evaluation was conducted in the following criteria:

G . . . Shorter than 60 sec

F . . . From 60 to shorter than 120 sec

P . . . Not shorter than 120 sec (6) Image Quality

The ink thus prepared was subjected to print test over 1 dot line on FX-L paper (available from Fuji Xerox Co., Ltd.) as a typical plain paper using a thermal ink jet printer which had been manufactured for evaluation. Focusing on line feathering and line thickening as properties to be evaluated, the evaluation thereof were conducted in the following criteria:

a) Line feathering

G . . . No feathering observed

F . . . Slight feathering observed

P . . . Whisker-like feathering observed at many points b) Line thickening

G . . . Less than 70 μm

F . . . From 70 μm to less than 100 μm

P . . . Not less than 100 μm

The results are set forth in Table 6.

TABLE 6

| | Example | Comparative Examples | | | | | |
|---|---|---|---|---|---|---|---|
| | 1 | 1 | 2 | 3 | 4 | 5 | 6 |
| Ink surface tension (mN/m) | 40 | 48 | 52 | 50 | 51 | 62 | 49 |
| Ink viscosity (mPas) | 1.6 | 2.7 | 2.2 | 1.5 | 1.7 | 1.5 | 2.5 |
| Cockle | G | F | P | P | P | P | G |
| Curl height | G | G | P | F | P | P | P |
| Anti-clogging properties | G | F | F | P | F | G | G |
| Drying time | G | P | F | F | F | F | F |
| Image quality a) | G | P | F | F | G | G | P |
| Image quality b) | G | F | G | G | G | G | F |

EXAMPLE 2

| C.I. Direct Yellow-144 | 3 parts by weight |
|---|---|
| Thiodiglycol | 20 parts by weight |
| Butyl carbitol | 5 parts by weight |
| Compound of formula (2) ($R_6$, $R_7 = C_6H_{13}$; $R_1$, $R_3$, $R_4$ = $CH_3$; $R_2$, $R_5$, $Y_1$, $Y_2$, $X = H$) | 3 parts by weight |
| Pure water | 70 parts by weight |

The above described components were thoroughly mixed to make a solution which was then filtered through a 0.45-μm filter to prepare an ink. The ink thus prepared exhibited a viscosity of 2.7 mPas and a surface tension of 36 mN/m. The results of the cockle and curl height evaluation test, the anti-clogging properties test, the drying time test and the image quality tests were all "good" in accordance with the above described criteria.

EXAMPLE 3

| C.I. Direct Black-168 | 3 parts by weight |
|---|---|
| Diethylene glycol | 15 parts by weight |
| Compound of formula (1) | 8 parts by weight |

-continued

| | |
|---|---|
| ($R_1 = C_{10}H_{21}$; $R_2$ to $R_5$ and $Y_1 = H$; $X = (C_2H_4O)_4H$) | |
| Polyoxyethylene polyoxypropylene block copolymer (Pluronic, available from BASF AG.) | 0.2 parts by weight |
| Pure water | 80 parts by weight |

The above described components were thoroughly mixed to make a solution which was then filtered through a 0.45-μm filter to prepare an ink. The ink thus prepared exhibited a viscosity of 2.1 mPas and a surface tension of 39 mN/m. The results of the cockle and curl height evaluation test, the anti-clogging properties test, the drying time test and the image quality tests were all "good" in accordance with the above described criteria.

EXAMPLE 4

| | |
|---|---|
| Carbon black | 4 parts by weight |
| Sodium naphthalenesulfonate-formalin condensate | 1 part by weight |
| 1,5-Pentanediol | 10 parts by weight |
| Compound of formula (1) ($R_1$, $R_3$, $R_4 = C_7H_{15}$; $R_2$, $R_5$, $Y_1 = H$; $X = (C_2H_4O)_8H$) | 3 parts by weight |
| Pure water | 80 parts by weight |

A carbon black dispersion was prepared from the carbon black, the sodium naphthalenesulfonate-formalin condensate and pure water. The carbon black dispersion was thoroughly mixed with the other components, and then filtered through a 1-μm filter under pressure to prepare an ink. The ink thus prepared exhibited a viscosity of 1.8 mPas and a surface tension of 52 mN/m. The results of the cockle and curl height evaluation test, the anti-clogging properties test, the drying time test and the image quality tests were all "good" in accordance with the above described criteria.

EXAMPLE 5

| | |
|---|---|
| C.I. Direct Yellow-86 | 2 parts by weight |
| 2-Pyrrolidone | 10 parts by weight |
| Compound of formula (3) ($R_1 = C_5H_{10}Cl$; $X = H$; $k = 6$) | 5 parts by weight |
| Isopropyl alcohol | 3 parts by weight |
| Lauryl betaine | 2 parts by weight |
| Pure water | 85 parts by weight |

The above described components were thoroughly mixed to make a solution which was then filtered through a 0.45-μm filter to prepare an ink. The ink thus prepared exhibited a viscosity of 1.8 mPas and a surface tension of 41 mN/m. The results of the cockle and curl height evaluation test, the anti-clogging properties test, the drying time test and the image quality tests were all "good" in accordance with the above described criteria.

EXAMPLE 6

| | |
|---|---|
| C.I. Acid Red-52 | 2 parts by weight |
| C.I. Direct Red-227 | 1 part by weight |
| Thiodiethanol | 10 parts by weight |
| Ethylene glycol | 5 parts by weight |
| Compound of formula (5) ($R_1 = C_{16}H_{31}$; $R_2$ to $R_5 = H$; $X = (C_2H_4O)_6H$; $m = 1$) | 1 part by weight |
| Polysiloxane-polyoxyethylene adduct | 0.2 parts by weight |
| Pure water | 85 parts by weight |

The above described components were thoroughly mixed to make a solution which was then filtered through a 0.45-μm filter to prepare an ink. The ink thus prepared exhibited a viscosity of 1.9 mPas and a surface tension of 31 mN/m. The results of the cockle and curl height evaluation test, the anti-clogging properties test, the drying time test and the image quality tests were all "good" in accordance with the above described criteria.

EXAMPLE 7

| | |
|---|---|
| C.I. Direct Blue-199 | 2 parts by weight |
| Acid Blue-9 | 1 part by weight |
| Ethylene glycol | 10 parts by weight |
| Compound of formula (4) ($R_1 = C_{18}H_{35}$; $R_2$, $R_3 = H$; $X = (C_2H_4O)_{10}H$) | 2 parts by weight |
| Oxyethylene oleyl ether | 0.1 parts by weight |
| Pure water | 85 parts by weight |

The above described components were thoroughly mixed to make a solution which was then filtered through a 0.45-μm filter to prepare an ink. The ink thus prepared exhibited a viscosity of 1.6 mPas and a surface tension of 42 mN/m. The results of the cockle and curl height evaluation test, the anti-clogging properties test, the drying time test and the image quality tests were all "good" in accordance with the above described criteria.

EXAMPLE 8

| | |
|---|---|
| C.I. Direct Black-154 | 3 parts by weight |
| Sulfolane | 10 parts by weight |
| Compound of formula (1) ($R_3$, $R_4 = C_{10}H_{21}$; $R_1$, $R_2$, $R_5$, $Y_1 = H$; $X = (C_2H_4O)_6H$) | 6 parts by weight |
| Styrene-anhydrous sodium maleate copolymer | 2 parts by weight |
| Pure water | 80 parts by weight |

The above described components were thoroughly mixed to make a solution which was then filtered through a 0.45-μm filter to prepare an ink. The ink thus prepared exhibited a viscosity of 1.6 mPas and a surface tension of 34 mN/m. The results of the cockle and curl height evaluation test, the anti-clogging properties test, the drying time test and the image quality tests were all "good" in accordance with the above described criteria.

EXAMPLE 9

| | |
|---|---|
| C.I. Direct Red-227 | 3 parts by weight |
| 2-Pyrrolidone | 20 parts by weight |
| Compound of formula (3) ($R_1 =$ Cylohexylmethyl; $X = (C_3H_6O)_5H$); $k = 8$) | 5 parts by weight |

-continued

| Diethylene glycol monohexyl ether | 3 parts by weight |
|---|---|
| Pure water | 70 parts by weight |

The above described components were thoroughly mixed to make a solution which was then filtered through a 0.45-μm filter to prepare an ink. The ink thus prepared exhibited a viscosity of 2.8 mPas and a surface tension of 31 mN/m. The results of the cockle and curl height evaluation test, the anti-clogging properties test, the drying time test and the image quality tests were all "good" in accordance with the above described criteria.

EXAMPLE 10

| X-38 black dye (available from BASF AG.) | 4 parts by weight |
|---|---|
| Thiodiethanol | 5 parts by weight |
| Glycerin | 10 parts by weight |
| Compound of formula (5) ($R_1 = C_{14}H_{29}$; $R_2$ to $R_5$ and X = H; m = 2) | 3 parts by weight |
| Sodium benzoate | 2 parts by weight |
| Surface active agent (Surfynol 465, available from Nisshin Chemical Industry Co., Ltd.) | 0.05 parts by weight |
| Pure water | 75 parts by weight |

The above described components were thoroughly mixed to make a solution which was then filtered through a 0.45-μm filter to prepare an ink. The ink thus prepared exhibited a viscosity of 1.9 mPas and a surface tension of 36 mN/m. The results of the cockle and curl height evaluation test, the anti-clogging properties test, the drying time test and the image quality tests were all "good" in accordance with the above described criteria.

EXAMPLE 11

| Carbon black | 5 parts by weight |
|---|---|
| Acrylic acid-methyl methacrylate copolymer | 3 parts by weight |
| Glycerin | 20 parts by weight |
| Compound of formula (1) ($R_3$, $R_4$ = Nonafluoropentyl; $R_1 = CH_3$; $R_2$, $R_5$, $Y_1$ = H; $X = (C_3H_6O)_5H$) | 2 parts by weight |
| Surface active agent (Surfynol 104) | 0.1 parts by weight |
| Pure water | 70 parts by weight |

A carbon black dispersion was prepared from the carbon black, the acrylic acid-methyl methacrylate copolymer and pure water. The carbon black dispersion was thoroughly mixed with the other components, and then filtered through a 1-μm filter under pressure to prepare an ink. The ink thus prepared exhibited a viscosity of 2.2 mPas and a surface tension of 33 mN/m. The results of the cockle and curl height evaluation test, the anti-clogging properties test, the drying time test and the image quality tests were all "good" in accordance with the above described criteria.

EXAMPLE 12

| C.I. Food Black-2 | 2 parts by weight |
|---|---|
| Propylene glycol | 10 parts by weight |
| Compound of formula (2) ($R_1 = C_{12}H_{25}$; $R_3$, $R_4$, $R_6$, $R_7$ = $CH_3$; $R_2$, $R_5$, $Y_1$, $Y_2$ = H; $X = (C_3H_6O)_4H$) | 3 parts by weight |
| Pure water | 85 parts by weight |

The above described components were thoroughly mixed to make a solution which was then filtered through a 0.45-μm filter to prepare an ink. The ink thus prepared exhibited a viscosity of 1.4 mPas and a surface tension of 45 mN/m. The results of the cockle and curl height evaluation test, the anti-clogging properties test, the drying time test and the image quality tests were all "good" in accordance with the above described criteria.

EXAMPLE 13

| Projet. Fast. Black-2 dye, (available from Zeneka Corp.) | 3 parts by weight |
|---|---|
| 2-Pyrrolidone | 15 parts by weight |
| Compound of formula (4) ($R_1$ = P-ethylbenzyl; $R_2$, $R_3$ = H; $X = (C_2H_4O)_3H$) | 8 parts by weight |
| Fluorine surface active agent (Fluorad FC-104, available from 3M Corp.) | 0.01 parts by weight |
| Pure water | 75 parts by weight |

The above described components were thoroughly mixed to make a solution which was then filtered through a 0.45-μm filter to prepare an ink. The ink thus prepared exhibited a viscosity of 2.3 mPas and a surface tension of 28 mN/m. The results of the cockle and curl height evaluation test, the anti-clogging properties test, the drying time test and the image quality tests were all "good" in accordance with the above described criteria.

EXAMPLE 14

| C.I. Direct Black-168 | 4 parts by weight |
|---|---|
| Diethylene glycol | 20 parts by weight |
| Compound of formula (2) ($R_6$, $R_7 = C_{10}H_{21}$; $R_1$ to $R_5$, $Y_1$, $Y_2 = CH_3$; $X = (C_2H_4O)_6H$) | 0.5 parts by weight |
| Oxyethylene stearyl ether | 0.5 parts by weight |
| Pure water | 80 parts by weight |

The above described components were thoroughly mixed to make a solution which was then filtered through a 0.45-μm filter to prepare an ink. The ink thus prepared exhibited a viscosity of 2.1 mPas and a surface tension of 41 mN/m. The results of the cockle and curl height evaluation test were "fair" in accordance with the above described criteria. The results of the anti-clogging properties test, the drying time test and the image quality tests were all "good" in accordance with the above described criteria.

EXAMPLE 15

| | |
|---|---|
| C.I. Direct Blue-199 | 3 parts by weight |
| Propylene glycol | 10 parts by weight |
| Ethylene glycol | 5 parts by weight |
| Butyl carbitol | 3 parts by weight |
| Compound of formula (2) ($R_1 = C_{10}H_{21}$; $R_3$, $R_4$, $R_6$, $R_7 = CH_3$; $R_2$, $R_5$, $Y_1$, $Y_2 = H$; $X = (C_2H_4O)_3H$) | 2 parts by weight |
| Pure water | 80 parts by weight |

The above described components were thoroughly mixed to make a solution which was then filtered through a 0.45-μm filter to prepare an ink. The ink thus prepared exhibited a viscosity of 1.8 mPas and a surface tension of 39 mN/m. The ink was then used for printing using a printer for evaluation of the type in which printing is effected under heating to expedite the drying of ink. The cockle and curl height evaluation test, anti-clogging properties test, drying time test and image quality test were then conducted in the same manner as in the above described Examples. The results were all "good" in accordance with the above described criteria.

EXAMPLE 16

| | |
|---|---|
| Carbon Black | 5 parts by weight |
| Acrylic acid-methyl methacrylate copolymer | 3 parts by weight |
| 2-Pyrrolidone | 10 parts by weight |
| Glycerin | 5 parts by weight |
| Compound of formula (1) ($R_3$, $R_4$ = Nonafluoropentyl; $R_1 = CH_3$; $R_2$, $R_5$, $Y_1 = H$; $X = (C_3H_6O)_5H$) | 2 parts by weight |
| Surface active agent (Surfynol 104, available from Nisshin Chemical Industry Co., Ltd.) | 0.1 parts by weight |
| Urea | 3 parts by weight |
| Pure water | 75 parts by weight |

The above described components were thoroughly mixed to make a solution which was then filtered through a 1.0-μm filter to prepare an ink. The ink thus prepared exhibited a viscosity of 2.0 mPas and a surface tension of 31 mN/m. The ink was then subjected to cockle and curl height evaluation test, anti-clogging properties test, drying time test and image quality test using the same printer for evaluation as used in Example 15. The results were all "good" in accordance with the above described criteria.

EXAMPLE 17

Using the four kinds of-inks, i.e., the ink of Example 2, cyan and magenta inks prepared in the same manner as in Example 2 except that the dye used in Example 2 was replaced by C.I. Acid Blue-9 and C.I. Acid Red-52, respectively, and the ink of Example 4, the following evaluation was conducted.
(8) Superimposed Image Quality 8×18 cm blue, green and red secondary color solid batch printing was effected on A4 size FX-L paper and Xerox 4024 paper using a thermal ink jet printer which had been manufactured for evaluation. The printed matter was then evaluated for cockle and curl height in the same manner as in the test (1). Further, the uniformity in the periphery portion of the solid image was evaluated in accordance with the following criterion:
(Solid uniformity)

G . . . No disturbance observed

F . . . Slight disturbance observed

P . . . Rough, less smooth

The results of cockle, curl height and solid uniformity were all "good" in accordance with the above described criteria.

EXAMPLE 18

| | |
|---|---|
| Carbon Black | 4 parts by weight |
| Methacrylic acid-methyl methacrylate sodium salt copolymer | 1.5 parts by weight |
| Glycerin | 10 parts by weight |
| Compound of formula (1) ($R_1 = C_{14}H_{27}$; $R_2$, $R_5$ and $Y_1$ = H; $R_3$, $R_4 = C_3H_7$; $X = (EO)_{25}H$) | 5 parts by weight |
| Pure water | 80 parts by weight |

A carbon dispersion was prepared from the carbon black, the methacrylic acid-methyl methacrylate sodium salt copolymer and pure water. The carbon dispersion was thoroughly mixed with the other components, and then filtered through a 1-μm filter under pressure to prepare an ink. The ink thus prepared exhibited a viscosity of 1.8 mPas, a surface tension of 47 mN/m and a pH value of 8.9. The droping amount of the ink was 28 ng. The ink was then subjected to cockle and curl height evaluation test, image quality tests, anti-clogging properties test and drying time test using a thermal ink jet printer having a resolution of 600 dpi which had been manufactured for evaluation. The thermal ink jet printer was of the type in which one droplet is formed by the application of a driving signal consisting of a 1-μsec prepulse, a 0.7-μsec pause between prepulse and main pulse and a 3.5-μsec main pulse. The results of these tests were all "good" in accordance with the above described criteria.

The pH values and jetted amounts of inks of Examples and comparative Examples are shown in Table 7 below.

TABLE 7

| Example No. | pH | Jetted amount (ng) |
|---|---|---|
| Example 1 | 6.5 | 27 |
| Example 2 | 5.7 | 18 |
| Example 3 | 7.8 | 22 |
| Example 4 | 9.3 | 31 |
| Example 5 | 8.2 | 25 |
| Example 6 | 6.4 | 24 |
| Example 7 | 7.2 | 26 |
| Example 8 | 8.7 | 28 |
| Example 9 | 7.4 | 19 |
| Example 10 | 8.1 | 24 |
| Example 11 | 9.5 | 45 |
| Example 12 | 6.7 | 53 |
| Example 13 | 9.1 | 40 |
| Example 14 | 7.5 | 51 |
| Example 15 | 6.8 | 48 |
| Example 16 | 8.9 | 55 |
| Comparative Example 1 | 6.4 | 23 |
| Comparative Example 2 | 6.6 | 25 |
| Comparative Example 3 | 6.5 | 26 |
| Comparative Example 4 | 6.6 | 26 |
| Comparative Example 5 | 6.7 | 24 |
| Comparative Example 6 | 7.1 | 22 |

As described above, the ink of the present invention comprises a compound having a plurality of hydroxyl groups and at least one group selected from the group consisting of alkyl, haloalkyl, alkenyl, alkinyl, cycloalkyl and aromatic groups. Thus, when applied to an ink jet recording process, the ink of the present invention can exert effects of inhibiting curling and cockle on the printed paper, image disturbance and nozzle clogging and of accelerating the drying of the image. Accordingly, the use of the ink of the present invention makes it possible to obtain a uniform image with a high resolution and density in an ink jet recording process.

While the invention has been described in detail and with reference to specific examples thereof, it will be apparent to one skilled in the art that various changes and modifications can be made therein without departing from the spirit and scope thereof.

What is claimed is:

1. An ink for ink jet recording process, comprising water, a coloring material and a water-soluble organic solvent, wherein said ink further comprises a compound having a plurality of hydroxyl groups and at least one group selected from the group consisting of alkyl, haloalkyl, alkenyl, alkinyl, cycloalkyl and aromatic groups each having from 5 to 18 carbon atoms.

2. The ink for ink jet recording process according to claim 1, wherein said compound is represented by one of the following formulas:

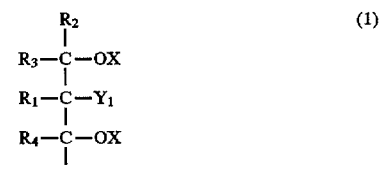

(1)

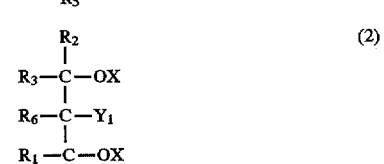

(2)

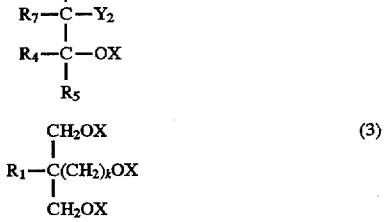

(3)

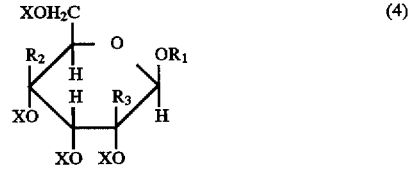

(4)

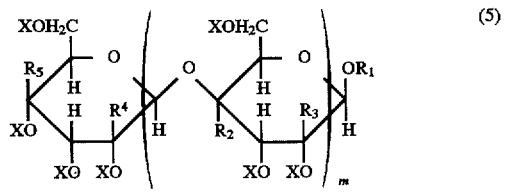

(5)

wherein X represents a hydrogen atom, $(C_2H_4O)_pH$ or $(C_3H_6O)_pH$; $Y_1$ and $Y_2$ each represent a hydrogen atom, OH, $(C_2H_4O)_qH$ or $(C_3H_6O)_qH$, wherein p and q each represent an integer of from 1 to 60; $R_1$ to $R_7$ each represent a hydrogen atom, $C_nH_{2n+1}$, $C_nH_{2n-1}$, $C_nH_{2n-3}$, $C_nH_{2n+1-x}Z_x$, $C_nH_{2n-1-x}Z_x$, $C_nH_{n-1-x}Z_x$ (wherein Z represents a halogen atom, and n represents an integer of from 1 to 18), an aromatic group, a hydrocarbon group having an aromatic ring or a halogen-substituted aromatic group, provided that at least one of $R_1$ to $R_7$ is a hydrocarbon group having from 5 to 18 carbon atoms; k represents an integer of from 1 to 8; and m represents an integer of from 1 to 4.

3. The ink for ink jet recording process according to claim 2, wherein the content of said compound in the ink is from 0.01 to 20% by weight.

4. The ink for ink jet recording process according to claim 3, wherein the content of said compound in the ink is from 0.01 to 10% by weight.

5. The ink for ink jet recording process according to claim 2, wherein p and q are each from 1 to 40.

6. The ink for ink jet recording process according to claim 2, wherein $Y_1$ and $Y_2$ in said compound each represents a hydrogen atom.

7. The ink for ink jet recording process according to claim 2, wherein said compound has at least one hydrocarbon group having from 5 to 18 carbon atoms.

8. The ink for ink jet recording process according to claim 2, wherein the content of said water-soluble organic solvent in the ink is from 1 to 60% by weight.

9. The ink for ink jet recording process according to claim 2, further comprising a surface active agent.

10. The ink for ink jet recording process according to claim 9, wherein said surface active agent is at least one selected from the group consisting of nonionic surface active agents, anionic surface active agents and amphoteric surface active agents.

11. The ink for ink jet recording process according to claim 9, wherein the content of said surface active agent in the ink is from 0.001 to 10% by weight.

12. The ink for ink jet recording process according to claim 1, wherein the pH value of said ink is from 3 to 11.

13. The ink for ink jet recording process according to claim 1, further comprising a thickening agent.

14. The ink for ink jet recording process according to claim 1, wherein the viscosity of said ink is from 1.3 to 5 mPas.

15. An ink jet recording process which comprises jetting ink droplets through an orifice in response to a recording signal to effect recording, said ink comprising water, a coloring material and a water-soluble organic solvent, wherein said ink further comprises a compound having a plurality of hydroxyl groups and at least one group selected from the group consisting of alkyl, haloalkyl, alkenyl, alkinyl, cycloalkyl and aromatic groups each having from 5 to 18 carbon atoms.

16. The ink jet recording process according to claim 15, wherein said compound is represented by one of the following formulas:

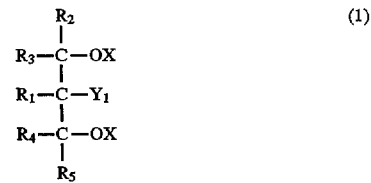

(1)

-continued (2) 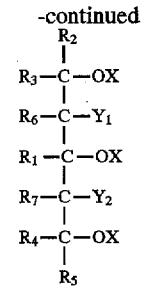

(3) 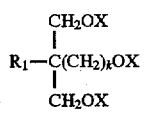

(4) 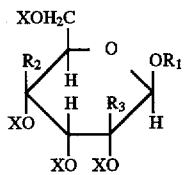

(5) 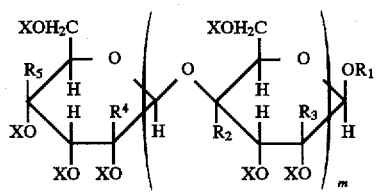

wherein X represents a hydrogen atom, $(C_2H_4O)_pH$ or $(C_3H_6O)_pH$; $Y_1$ and $Y_2$ each represent a hydrogen atom, OH, $(C_2H_4O)_qH$ or $(C_3H_6O)_qH$, wherein p and q each represent an integer of from 1 to 60; $R_1$ to $R_7$ each represent a hydrogen atom, $C_nH_{2n+1}$, $C_nH_{2n-1}$, $C_nH_{2n-3}$, $C_nH_{2n+1-x}Z_x$, $C_nH_{2n-1-x}Z_x$, $C_nH_{n-1-x}Z_x$ (wherein Z represents a halogen atom, and n represents an integer of from 1 to 18), an aromatic group, a hydrocarbon group having an aromatic ring or a halogen-substituted aromatic group, provided that at least one of $R_1$ to $R_7$ is a hydrocarbon group having from 5 to 18 carbon atoms; k represents an integer of from 1 to 8; and m represents an integer of from 1 to 4.

17. The ink jet recording process according to claim 16, wherein the jet amount of said ink per pulse is from 10 to 100 ng.

18. The ink jet recording process according to claim 16, wherein said jetting of ink is conducted using a heating member.

19. The ink jet recording process according to claim 18, wherein said jetting is conducted by applying a prepulse and a recording signal.

\* \* \* \* \*